Nov. 17, 1970 B. RANDELL 3,541,528

IMPLICIT LOAD AND STORE MECHANISM

Filed Jan. 6, 1969 6 Sheets-Sheet 1

INVENTOR
BRIAN RANDELL

BY [signature]

ATTORNEY

IMPLICIT LOAD AND STORE MECHANISM

Nov. 17, 1970 B. RANDELL 3,541,528

IMPLICIT LOAD AND STORE MECHANISM

Filed Jan. 6, 1969 6 Sheets-Sheet 5

United States Patent Office 3,541,528
Patented Nov. 17, 1970

3,541,528

IMPLICIT LOAD AND STORE MECHANISM

Brian Randell, Pleasantville, N.Y., assignor to International Business Machines Corporation, Armonk, N.Y., a corporation of New York Filed Jan. 6, 1969, Ser. No. 789,221
Int. Cl. G06f 9/00, 9/20
U.S. Cl. 340—172.5 12 Claims

ABSTRACT OF THE DISCLOSURE

An implicit load and store mechanism for loading and storing local registers while a specified operation is occurring in the main computer system. By means of the disclosed mechanism, many load and store operations may be removed from a program loop. The use of a special instruction format and expanded local storage capability allows an execute instruction within a loop to also cause the loading from memory and storing in memory of said local registers essentially concurrently with the execution of said instruction.

BACKGROUND OF THE INVENTION

In today's modern high speed computers, instruction processing is one of the major time consuming operations which must be performed by the computer in doing a particular job. More particularly, many memory fetches are normally required for both the accessing of instructions and also the accessing of data in accordance with said instructions which data is to be actually manipulated by the computer. Due to the great advances made in modern technology, the speed of the various logic circuitry including the arithmetic units, etc., is much greater than that of the magnetic memories universally used for bulk storage purposes of both the instruction stream and the data. Local or working registers are utilized in the arithmetic unit for moving and storing data obtained from memory and in the instruction unit for storing individual instructions as they are being processed and executed.

Various systems are currently used to achieve instruction lookahead whereby instructions are actually fetched from memory ahead of time and retrieved in temporary storage locations while current instructions are being executed. Thus some overlap of memory operation is possible by utilizing such instruction lookahead techniques.

However, once the instructions are in the instruction register, it is then necessary to decode same and fetch various segments of data from memory which are to be acted upon. Thus, for example, in a normal two operand operation such as multiply, the operands must be separately fetched from memory, stored in local registers, the multiplication must be performed and then the result subsequently stored in memory. Thus before the multiply can proceed, the operands must be fetched and before the next instruction can be decoded and performed, the result must be stored. This situation is rendered more difficult in loop type operations where, for example, a particular arithmetic operation is to recur a considerable number of times. Thus, each time the loop is to be executed the instructions specifying the various steps of the loop must be fetched, the data specified thereby must be accessed, the operation performed and the result restored in memory. This sequence of operations must, in essence, be continued until some loop criteria is met.

Various means are known in the art for retaining the complete set of loop instructions in a local high speed store to somewhat reduce the delay in returning to the front of the loop where it is to be re-entered. However, insofar as is known, most present day systems require the specification of the new data to be accessed from memory each time the loop is traversed. The instructions which perform this instruction therefore have to be decoded each time the loop is traversed, after which the address in memory of the new data can be calculated and the data fetched to the registers. The same situation applies for storing computational results in back in memory.

SUMMARY OF THE INVENTION AND OBJECTS

It has now been found that an appreciable time saving may be effected in the performance of loop type operations, in particular, by providing a special instruction, decoding circuitry and additional storage fields in high speed local holding registers for operands and results whereby specific or explicit load and store operations may be taken out of the loop and in effect placed in the instruction stream before the loop is entered. A mechanism is thus provided for fetching and storing data automatically in local high speed storage while the previous operation is being executed.

It is a primary object of the present invention to provide a method by separating the specification of the effective address calculation from the actual load or store instructions which can be coded very compactly with, for example, a arithmetic operation.

It is a further object of the present invention to provide a method of speeding up instruction execution in a computer system.

It is a still further object to provide such a method requiring a minimum of additional hardware.

It is a still further object to provide a special instruction whereby data for a subsequent operation is pre-stored in local storage while a current instruction is being executed.

It is another object to reduce the length of program loops and thus execution time by the above means.

The foregoing and other objects, features and advantages of the invention will be apparent from the following more particular description of a preferred embodiment of the invention, as illustrated in the accompanying drawings.

DESCRIPTION OF THE DISCLOSED EMBODIMENT

Figure 1:
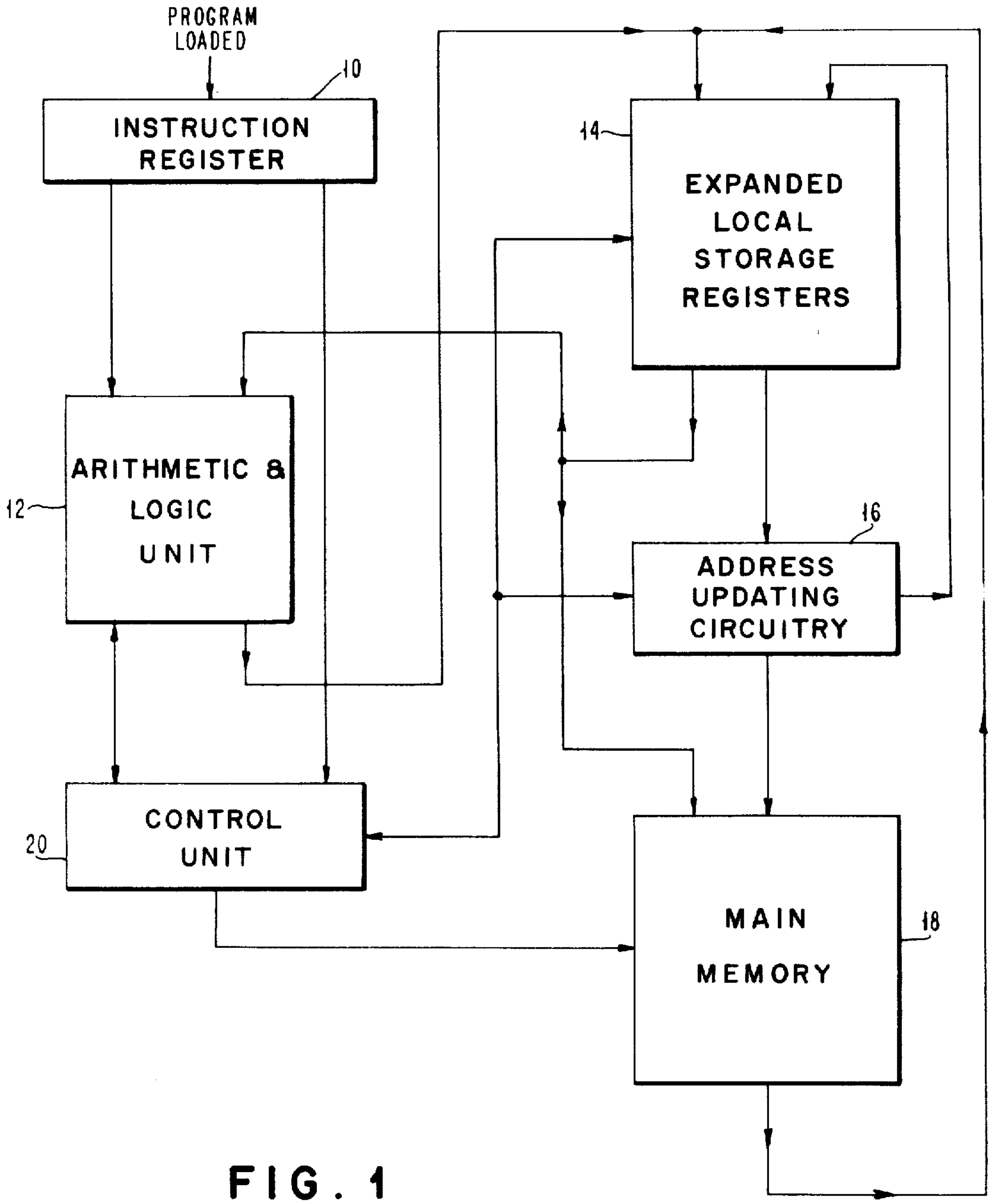
FIG. 1 comprises a functional block diagram of an improved instructional unit for a computing system as set forth in detail in FIG. 2.

The objects of the present invention are accomplished in general by a computer system including a main memory, an instruction processing unit, an arithmetic unit and a plurality of local storage registers wherein means are provided for initially loading said local storage registers with data and address generating information. Said instruction processing unit includes means actuable by a single execution instruction for transferring data currently in said local registers to another portion of the system and for causing said registers to be loaded from main memory in accordance with said address generating information contained therein. According to a further aspect of the invention, said single execution instruction may also cause the result of said instruction to be both stored in said local registers and also in main memory at a location determinable from said address generating information.

Thus, by utilizing the present invention, program loops, in particular may be materially shortened with attendant reduction in work effort by the programmer and also reduced machine execution time.

It should, of course, be understood that the conventional operation of such a computer system is unaffected by the additional hardware of the present invention. In other words, instructions will be accessed and processed in essentially the same way as will operation of the arithmetic and logical units and also the main memory. The significant difference in operation of the present system is that it is not necessary to explicitly specify fetch and store instructions within a loop once the local registers are loaded by a "preinstruction" for the loop sequence. The programmer will, of course, have to provide the proper structuring of the instruction and cause the sequences of data within memory to be accessible utilizing various address index values and effective address values which happen to be required by the specific hardware configuration utilized.

The advantages of the present system are indicated by the subsequent example. Assuming a system utilizing three address arithmetic, i.e., two operands and one result as well as an op-code, it will be assumed that the basic arithmetic instructions occupy a half word, and load/store instructions occupy a full word. Then, a program loop to perform, for instance, the following operation would be:

$$A[i] \leftarrow B[i] \times C[i] + D[i]$$

The above operation would involve three load instructions utilizing three machine words, one store instruction utilizing one machine word, one multiply and one add instruction each utilizing half a word and one "count and branch" instruction. However, if the implicit load and store technique of the present invention were utilized, the following procedures would apply.

(1) Use separate registers for A[$i$], B[$i$], C[$i$], and D[$i$].

(2) Specify the reloading of registers for B[$i$] and C[$i$] in the multiply instruction.

(3) Specify the reloading of the register for D[$i$], and the storing of the register for A[$i$] in the add instruction.

Assuming that "Count and Branch" also occupied a full word, the length of the inner loop would be reduced from 6 words to 2 words, i.e., one word for the multiply and add instructions and one word for the "count and branch" which evaluates the indicator [$i$]. This saving is of course at the expense of an increase in the number of instructions required to initialize the loop, and the possible fact that an unnecessary set of fetches may be performed on the last passage through the loop.

In the above example, a 66% saving is offered and although the above example is weighted, it is believed that many loops will exhibit a similar reduction in length though not necessarily this great. Savings in time would also be possible although not as great with different instruction formats, such as a two address format.

In specifically setting out the detailed operation of the present invention, the format for the preferred form of instruction word will be explained in the diagram below.

| | | | | | | |
|---|---|---|---|---|---|---|
| ADD | $F_i$ | i | $F_j$ | j | $F_k$ | k |

In the above instruction, the field marked ADD obviously refers to the operation to be performed. The fields represented by $i$, $j$, and $k$, are specifications of the local storage register in which the operands ($i$, $j$) and the result ($k$) are to be stored. The small fields, $F_i$, $F_j$, and $F_k$ indicate whether or not the particular register is to be reloaded or automatically stored concurently with arithmetic unit operation. The above instruction word format utilizing the ADD op-code performs the operation.

$$R_k := R_i + R_j$$

This instruction, as will be understood, will cause the operands currently appearing in the $i$ and $j$ registers of the Local Storage (see FIG. 1) to be gated to the Arithmetic Unit where an addition operation will be performed. Subsequent to this operation the result will be transferred back into the $k$ register. Assuming that all of the F fields are set to a "1," the following would occur:

First the data located in the $i$ local register would be gated to the arithmetic unit as the first operand. Concurrently, an address stored in this register position specifying the address in memory of the next operand for the loop would be extracted from the local register and that particular address accessed and the operand physically placed in the $i$ register and the current address updated accordingly to an index specified by the programmer (would normally be incremented by 1). The particular manner in which this address information is generated, according to the specific details of the presently disclosed embodiment will be set forth subsequently. However, for the present discussion a more generalized addressing technique is set forth as the specific address generation could be done in a wide variety of ways providing both for address generation, diagnostic information, etc. as will be readily appreciated by those skilled in the art. Similarly, the operand located in the $j$ register is gated to the arithmetic unit and the address stored therewith in the local registers utilized to similarly access the next operand from main memory which is to be placed in the now effectively empty $j$ register.

Finally, the arithmetic unit performs the operation and the instruction in the instruction register indicates that the result is to be placed in the $k$ register of the local storage registers. Thus, while the first set of operands are being processed in the arithmetic unit, the fetching of a subsequent set of operands is in essence proceedings concurrently therewith. Assuming that the $F_k$ is set to a "1," the result will be first gated into the data field of the $k$ register and concurrently the address information stored therewith will be examined and modified and utilized to also store the result of the operation in the address specified in the address portion of the $k$ register. Subsequent to the store operation the address portion will be modified (incremented) and gated back into the address portion of the $k$ register to set up a storage location for the next result utilizing this register in the particular loop operation.

The above description of the instruction word format for performing a typical execute operation utilizing the concepts of the present system essentially explains the basic operating procedures of the present invention. Thus, the rotating of the registers $i$ and $j$ is automatically achieved by the present invention without explicitly ordering same. Similarly, the storing of the register $k$ is automatically implied with the present instruction without specifically calling for said transfer. It will, of course, be understood, that the initial loading of the local storage registers must occur by appropriate program means under control of the programmer so that the necessary initial data load and address information is provided.

It will further be understood that more than three local registers may be utilized within the system. Two operand and one result register, i.e., $i$, $j$ and $k$, respectively, have been set forth as merely exemplary of the teachings of the present invention. However, it will be readily apparent that six, eight or ten such registers could be utilized within a system and called by the system programmer whenever necessary, keeping in mind of course that the registers called into operation must first be initially loaded before entering a loop or other routine utilizing said registers to provide the necessary initial data as well as the effective address and address increments.

Referring now particularly to the drawings, the invention will be specifically set forth and described with respect to the disclosed apparatus embodiment. FIG. 1 specifically shows, in a generally functional block diagram form, the essential functional elements of the system shown in more detail in FIGS. 2A–2D (subsequently referred to as FIG. 2). The Instruction Register 10 is essentially conventional in nature and receives the program instructions sequentially from the Main Memory 18. However, these conventional data flow paths are not shown in the present invention as they are completely well known in the art and to include the details of system operation would not materially add to the present invention as they are obvious. Only the essential control circuits necessary to the practice of the present invention are disclosed. Thus, a line is shown passing from the Instruction Register 10 into the Arithmetic Logic Unit 12 which merely transfers the op-code, i.e., add, subtract, multiply, etc., to the Arithmetic Unit 12. The Instruction Register, contains appropriate bit field locations $F_i$, $F_j$ and $F_k$ for controlling operations in the various local registers, i.e., *i*, *j*, and *k* referred to in the instruction. Their specific operation has been alluded to generally and will be specifically described subsequently. The Expanded Local Storage Registers 14 (Local Storage) comprise the local storage location for the operands and results and it is the automatic preloading of these registers and storing of the result register which comprise the essence of the present invention. As stated previously, storage space or a data field is allotted in these registers for the data word, and address generating information which in the present invention comprises an increment field and an effective address field which may be added together in the Address Updating Circuitry 16 to form the address for a current operand fetch, a current result store, and for forming the addresses for subsequent fetches and store steps. The Main Memory 18 is conventional in nature and only those data paths are shown which apply to the present invention, i.e., for fetching operands from memory and transferring same into the Local Store 14 and for storing results from the Local Storage 14 into the Main Memory 18. The Control Unit 20 contains primarily the special control system clock which appears in FIG. 2 and whose operation is described in detail subsequently in conjunction with the Timing Sequence Charts. It is this unit which essentially controls the sequence of operation of the present invention and initiates the operation of the above-described functional units when required.

Figures 2, 2A:
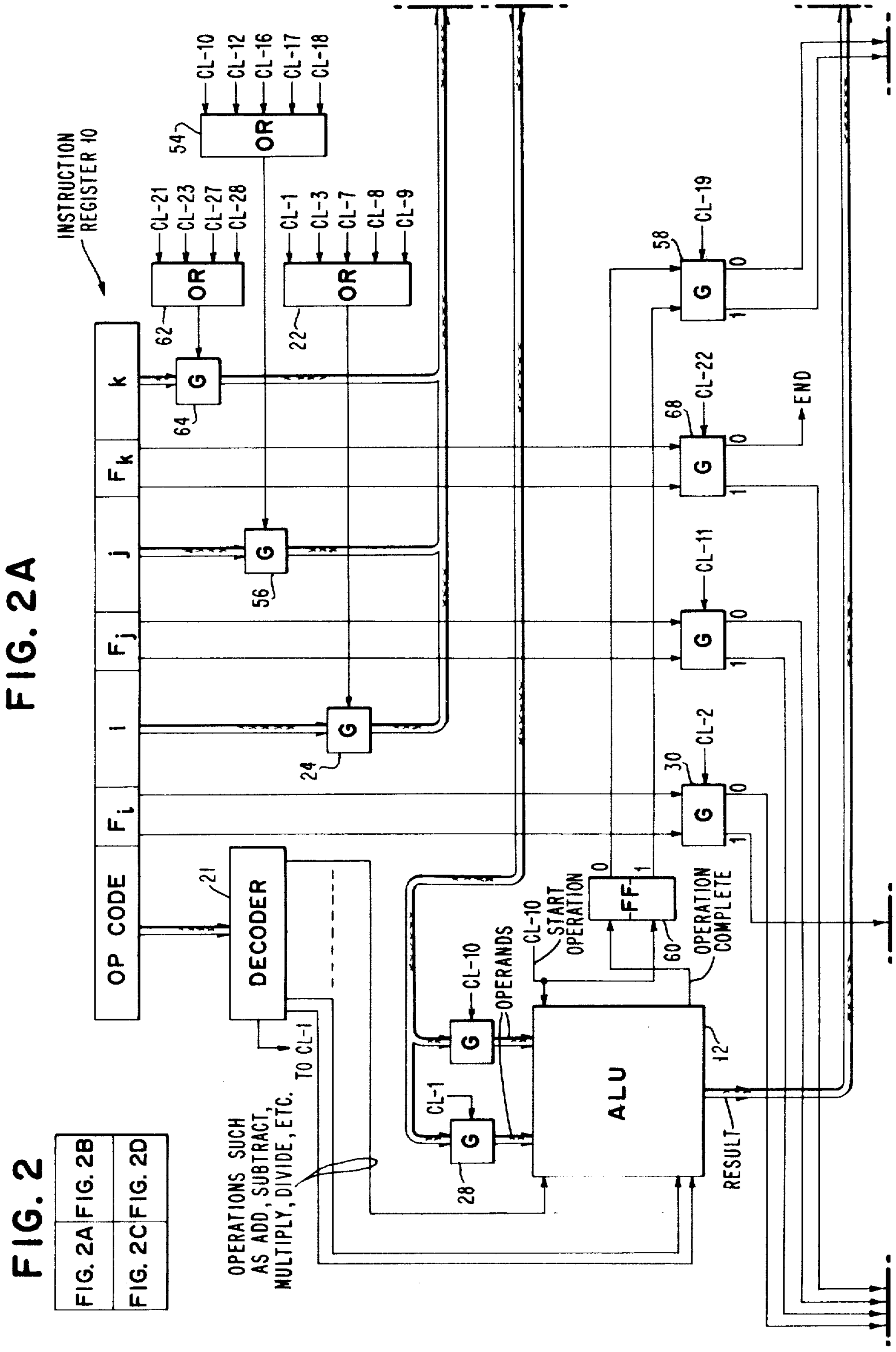
FIG. 2 is an organizational drawing indicating the layout for FIGS. 2A–2D.
FIGS. 2A–2D comprise a combined functional and logical schematic diagram of the preferred embodiment of the present invention.
Figure 2B:
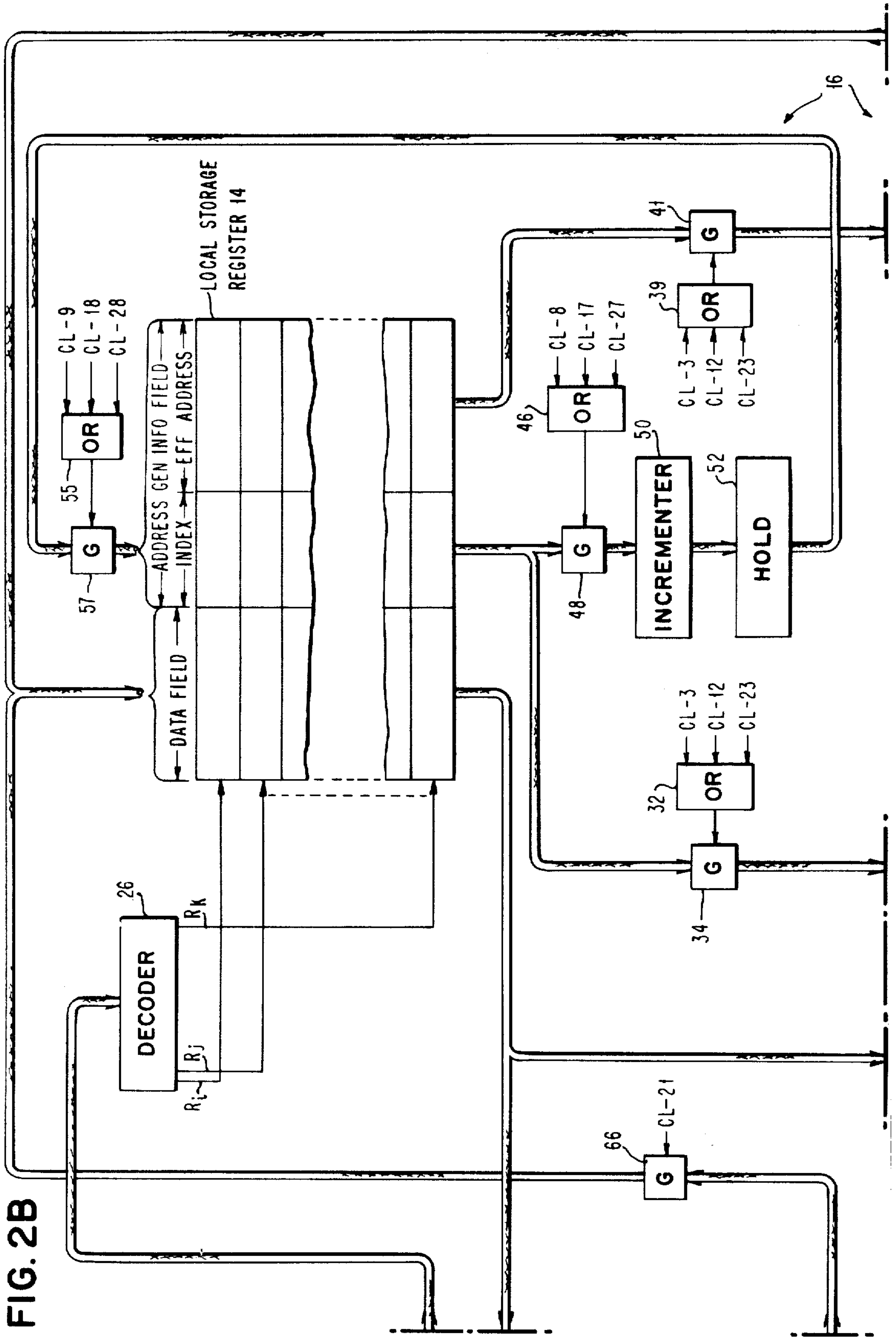
Figure 2C:
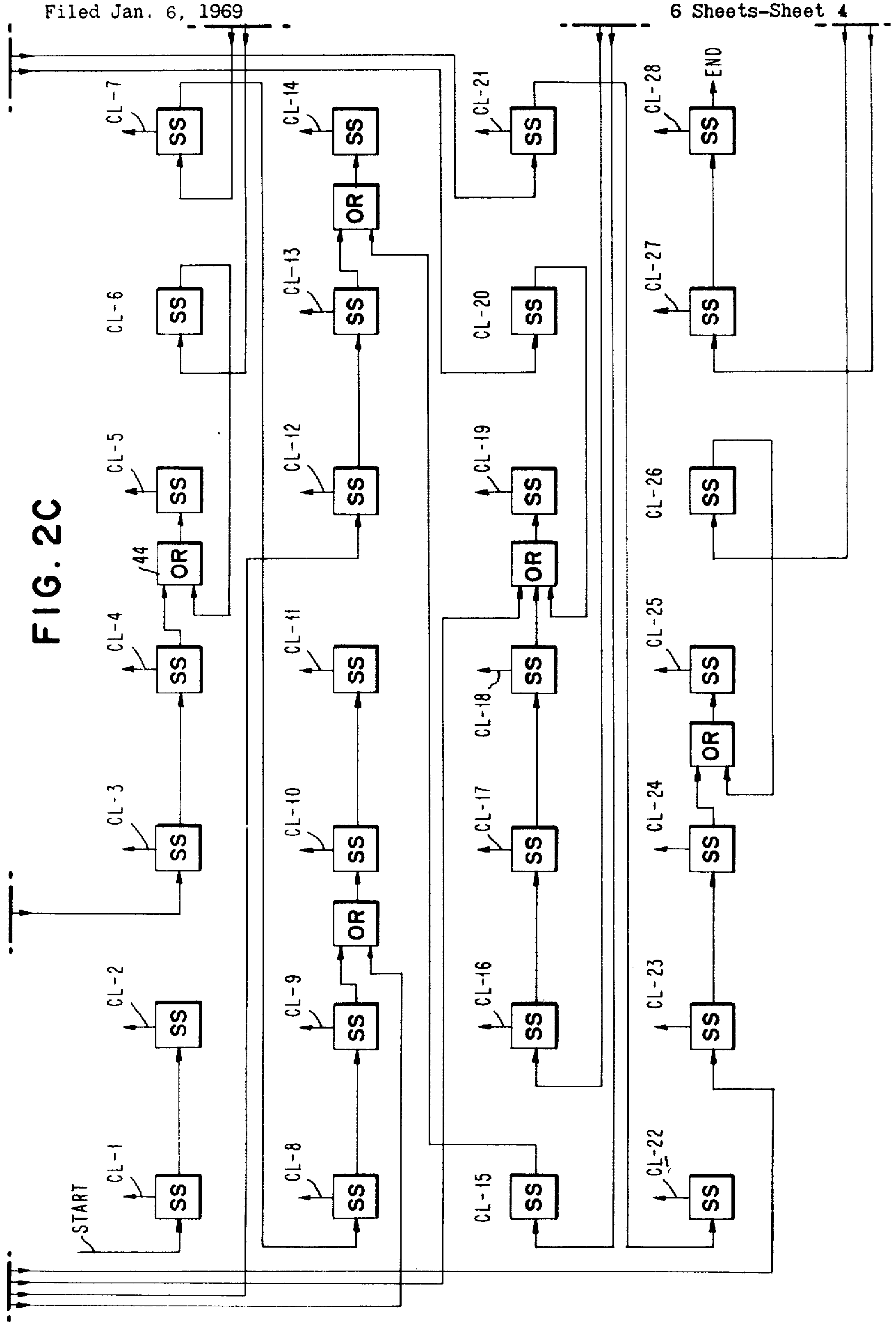
Figure 2D:
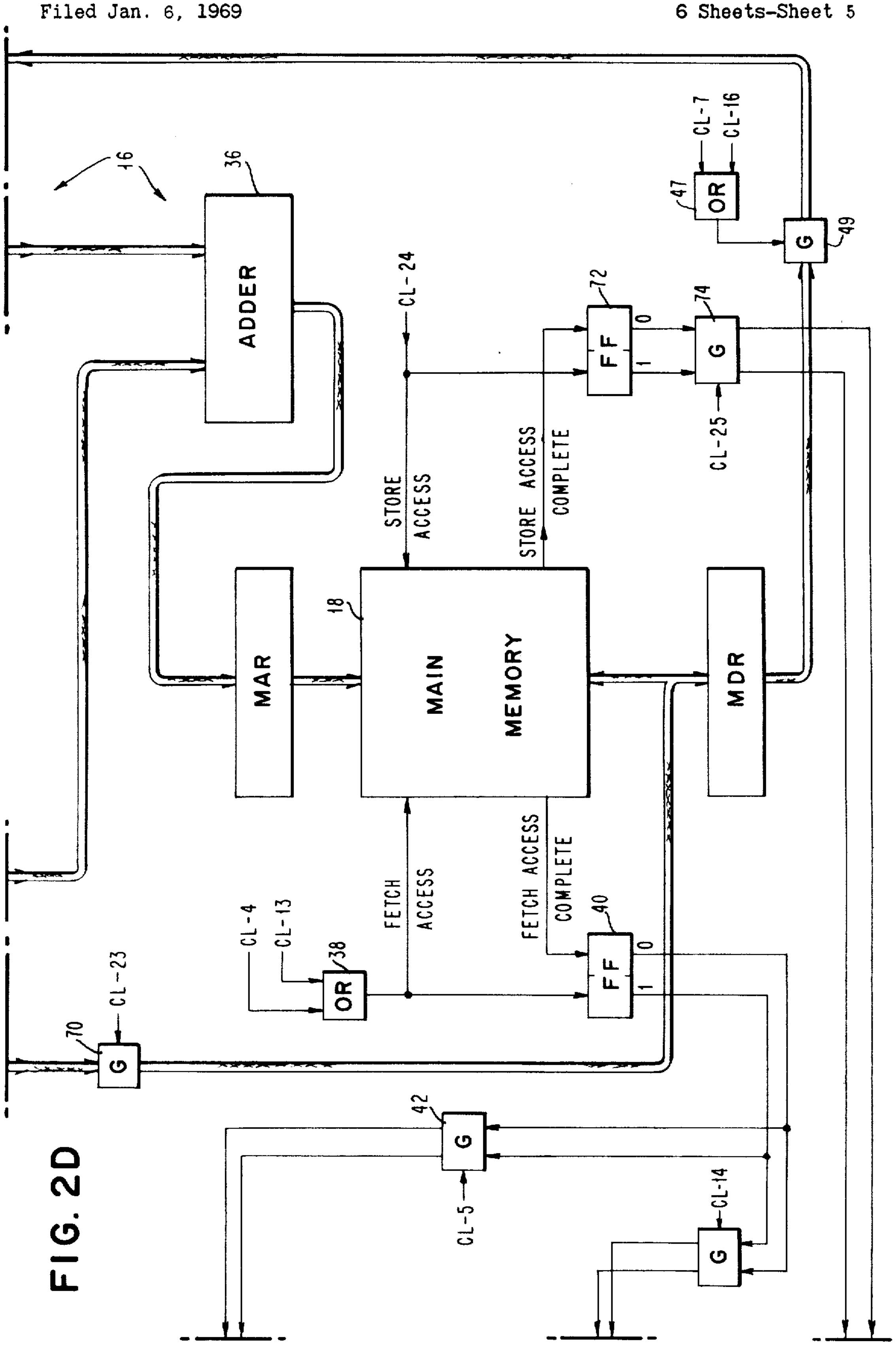

FIG. 2 comprises a combination logical and functional block diagram setting forth the essential features of a preferred form of the present invention. This figure will be described in detail subsequently with reference to the Timing Sequence Charts; however, a brief examination will reveal in FIG. 2A the Subtraction Register 10 with associated decoding controls and gates. Also shown on FIG. 2A is the Arithmetic and Logic Unit 12 (ALU) with buss lines indicating the data flow between this unit and the Local Storage 14. The Address Updating Circuitry is shown generally on FIGS. 2B and 2D and primarily includes the Incrementor 50, Hold Register 52 and Adder 36. The Main Memory 18 is shown on FIG. 2D and includes a conventional Memory Address Register (MAR) and a Memory Data Register (MDR). The majority of the Control Unit in contained on FIG. 2C and essentially comprises a series of single shots (SS) for producing the clock pulses CL–1 through CL–28. The operation of the single shots is well known in the art, the design being such that when they are initiated a clock pulse is produced and upon turn off a fixed time later, a "turn off" pulse is produced. In the convention of the present drawing, the initial or "turn-on" clock pulse is shown coming from the top of the individual single shots. The turn-off pulse is shown emanating from the right-hand side thereof.

Figure 3:
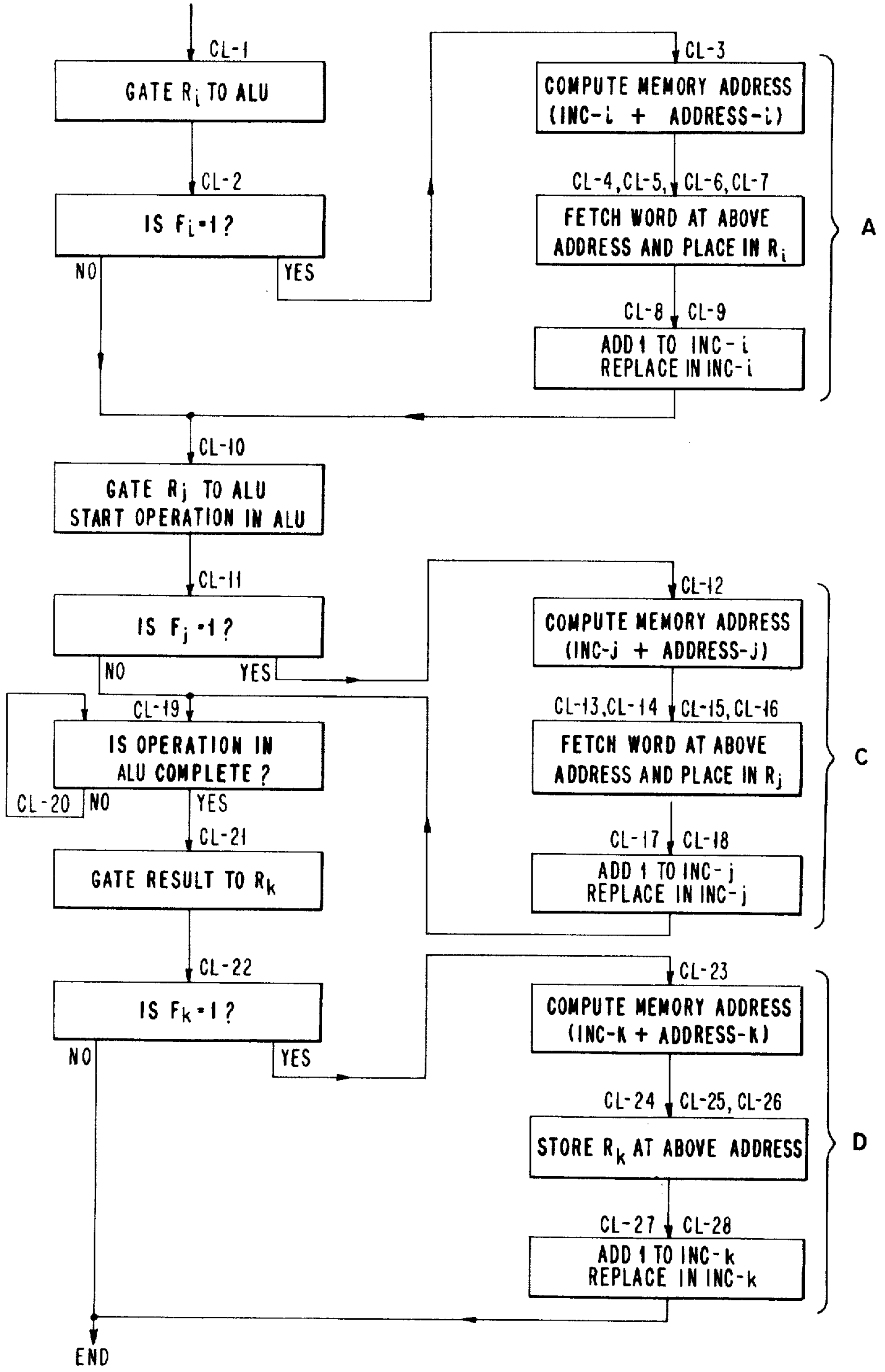
FIG. 3 comprises a flow chart of the operation of the preferred embodiment of the present invention set forth in FIGS. 2A–2D.

Referring now briefly to FIG. 3, there is shown a flow chart for the disclosed embodiment, i.e., of FIG. 2 wherein the *i*, *j* and *k* registers are provided and utilized. Referring to the figure, the left-hand column of steps comprises the main sequence of events in evaluating the instruction, gating the data into the ALU and returning the result to the storage registers. It will further be noted that the steps of evaluating the control fields $F_i$, $F_j$ and $F_k$ are initiated in this colume. The evaluation of these special control fields will carry the system into the implicit load and store operations indicated in the right-hand column steps. The three flow sequences marked A and C, respectively, represent the prefetching of the next operand from Main Memory under control of the address currently stored in Local Storage in the associated register position and also the updating of the address so that upon the subsequent cycle the next operand may be implicity fetched by the system. The three boxes indicated by the bracket D indicate the steps of storing the register *k* in the Main Storage at the address currently contained in the address portion of the register *k*. Thus, the address is gated out of the register and utilized to access the memory and store the result and subsequently this address is updated and restored in the local storage in the appropriate address field of register *k*.

It will also be noted that the various blocks contain indicated clock steps which together with the subsequent description in the Timing Sequence Charts may be utilized to further understand the detailed operation of the invention.

Having generally described the system with reference to FIGS. 1, 2 and 3, the detailed operation of the system will now be set forth utilizing the Timing Sequence Charts which follow immediately. These charts specify the specific operations carried out by each clock pulse. The subsequent description will go through the Timing Sequence Chart and describe the associated logical circuitry actuated by each clock pulse.

TIMING SEQUENCE TABLE

CL–1 Gate *i* field to Decoder
 Gate $R_i$ to ALU (data portion)
 Go to CL–2
CL–2 Test $F_i$
 If="1," go to CL–3
 If="0," go to CL–10
CL–3 Gate *i* field to Decoder 26
 Gate Increment *i* to Adder
 Gate Address field in $R_i$ to Adder
 Go to Cl–4
CL–4 Start Fetch Access
 Go to CL–5
CL–5 Is above complete?
 No, go to CL–6
 Yes, go to CL–7
CL–6 Delay
 Go to CL–5
CL–7 Gate MDR to $R_i$
 Gate *i* field to Decoder 26
 Go to CL–8
CL–8 Gate *i* field to Decoder 26
 Gate Increment in $R_i$ to Incrementer
 Go to CL–9
CL–9 Gate HOLD register to Increment field in $R_i$
 Gate *i* field to Decoder 26
 Go to CL–10
CL–10 Gate *j* field to Decoder 26
 Gate $R_j$ to ALU (data portion)
 Start operation in ALU
 Go to CL–11
CL–11 Test $F_j$
 If="1," o to CL–12
 If="0," go to CL–19
CL–12 Gate *j* field to Decoder 26
 Gate Increment in $R_j$ to Adder
 Gate Address in $R_j$ to Adder
 Go to CL–13
CL–13 Start fetch access
 Go to CL–14

CL–14 Is above complete?
 No, go to CL–15
 Yes, go to CL–6
CL–15 Delay
 CL–14
CL–16 Gate MDR to $R_j$ (data field)
 Gate $j$ field to Decoder
 Go to CL–17
CL–17 Gate $j$ field to Decoder
 Gate Increment in $R_j$ to Incrementer
 Go to CL–18
CL–18 Gate Hold register to Increment field of $R_j$
 Gate $j$ field to decoder
 Go to CL–19
CL–19 Is Operation in ALU complete?
 No, go to CL–20
 Yes, go to CL–21
CL–20 Delay
 Go to CL–19
CL–21 Gate $k$ field to Decoder
 Gate Result to $R_k$ (data field)
 Go to CL–22
CL–22 Test $F_k$
 If="1," go to CL–23
 If="0," go to END
CL–23 Gate $k$ field to Decoder
 Gate Increment field of $R_k$ to Adder
 Gate Address field of $R_k$ to Adder
 Gate $R_k$ to MDR (data field)
 Go to CL–24
CL–24 Start store access
 Go to CL–25
CL–25 Is above complete?
 No, go to CL–26
 Yes, go to CL–27
CL–26 Delay
 Go to CL–25
CL–27 Gate $k$ field to Decoder
 Gate Increment field of $R_k$ to Incrementer
 Go to CL–28
CL–28 Gate $k$ field to decoder
 Gate HOLD register to Increment field of $R_k$
 Go to END It will be assumed that the Local Storage 14 has been appropriately loaded with initial data and address information and that an operation is in the Instruction Register specifying an execute operation and the use of the three local registers $i$, $j$ and $k$, with the bits $F_i$, $F_j$ and $F_k$ set to a "1" thus implying both loading and storage of these registers during the operation. The existence of an execute instruction in the Instruction Register causes the Decoder 21 to produce a pulse which brings up CL–1. This pulse is applied to OR circuit 22 and gate 24 to gate the $i$ field of the Instruction Register to the Decoder 26 which specifies that the register $R_i$ is to be accessed and placed on the output buss from the Local Storage 14. CL–1 is also applied to gate 28 to gate the contents of the data field register $R_i$ to the ALU. The turn off of CL–1 initiates the CL–2. CL–2 is applied to gate circuit 30 to test the field $F_i$. If this is set to a "1," the clock branches to CL–3. If on "0," it would go to CL–10. It will be assumed that this field is set to a "1," thus specifying an implicit load instruction.

The turn on of CL–3 is applied to OR circuit 22 and gate 24 to again gate the $i$ field from the Instruction Register to the decoder 26 which again accesses the Local Storage 14 in register position $R_i$. CL–3 is also applied to OR circuit 32 which brings up gate 34 to gate the "increment" field from register $R_i$ into the Adder 36. CL–3 is also applied to OR circuit 39 which enables the gate circuit 41 to gate the "affective address' field of the register $R_i$ to the Adder 36. The output of the Adder Q6 is then passed to the Memory Address Register for the Main Memory 18. The turn off of CL–3 initiates CL–4.

The CL–4 pulse is applied to OR circuit 38 which starts a fetch access in the Main Memory 18 at the address specified by the MAR. It also sets the flip-flop 40 to a "1" which will be reset to a "0" when the memory fetch access is complete. The turn off of CL–4 initiates CL–5. CL–5 is applied to gate 42 and is used to determine whether or not the fetch access is in fact complete. If the flip-flop 40 is still set to a "1," the gate 42 will cause the system to proceed to CL–6 which is merely a delay and the turn off of this pulse is applied to OR circuit 44, the output of which re-initiates CL–5. Assuming that the flip-flop 40 is now set to a "0," the system then proceeds to CL–7.

CL–7 is applied to OR circuit 47 which brings up gate 49 to gate the contents of the MDR into the Local Storage data input line. Concurrently therewith, CL–7 is also applied to OR circuit 22 and gate 24 to cause the MDR contents to be stored in the data field of the $R_i$ register. The turn off of CL–7 initiates CL–8.

The turn on of CL–8 is applied to OR circuit 22 which brings up gate 24 to gate the contents of the $i$ field of the Instruction Register again to the Decoder 26 to access the Local Storage at the register position $R_i$. Concurrently CL–8 is applied to OR circuit 46 which brings up gate 48 to gate the "increment" field of the $R_i$ register to the Incrementer 50 wherein it is incremented by 1 and passed into the Hold Register 52 which is in essence a delay and allows CL–9, upon the turn off of CL–8, to be applied to OR circuit 55 which brings up gate circuit 57 to gate the incremented address in the Hold Register 52 into the "increment" field of the register $R_i$. As before, the $i$ field of the Instruction Register is passed by CL–9 through decoder 26 and thus brings up the register $R_i$. The turn off of CL–9 completes the store operation in the Local Register $R_i$ specified by the $i$ field of the Instruction Register.

The turn on of CL–10 initiates exactly the same operation for the $j$ field of the Instruction Register and involves the evaluation of the field $F_j$. In the sequence of clock steps CL–10 through CL–18, the primary difference is that the clock pulses CL–10, CL–12, CL–16, CL–17 and CL–18 are applied to the OR circuit 54 which enables gate 56 to gate the $j$ field of the Instruction Register to the Decoder 26 which now accesses the register position $R_j$ in the Local Store 14. The other operations are essentially identical, i.e., CL–12 is applied to OR circuits 32 and 39 to gate the contents of the two address fields to the Adder 36 as with pulses CL–3, etc. Thus, assuming that a "1" was placed in the field $F_j$, the register position $R_j$ will be assumed to be loaded with a new data word from Main Memory upon the turn off of CL–18 which brings up CL–19.

The turn on of CL–19 is applied to gate 58 to test the setting of the flip-flop 60 which was set to a "1" state when the ALU operation was initiated. This was done by pulse CL–10. The completion of the particular operation in the ALU causes the "operation complete" line to come up setting the flip-flop 60 back to its "0" state. If the operation is not complete, CL–20 is initiated which is merely a delay and cycles back to CL–19. Assuming that the operation is complete, CL–21 is initiated. CL–21 is applied to OR circuit 60 which activates gate 64 to gate the $k$ field of the Instruction Register to the Decoder 26 to access the register position $R_k$ of the Local Storage 14. CL–21 is also applied to gate 66 which gates the result from the ALU into the data field of the register position $R_k$. The turn off of CL–21 brings up CL–22. CL–22 is applied to gate 68. If a "0" is detected, the present sequence of operations is ended and the next instruction would be gated into the Instruction Register; however, assuming that this field is set to a "1," the clock proceeds to CL–23. CL–23 is applied to OR gate 62 thus enabling gate 64 to again gate the $k$ field of the Instruction Register to the Decoder 26 to access the Local register position $R_k$. CL–23 is also applied to OR gate 32 and gate 34 to pass the "increment" field of register position $R_k$ to the Adder 36. Pulse 23 is also applied to OR gate 39 to enable gate 40 to gate the "affective address" field from the register position $R_k$ to the Adder 36. The output of the adder is then directly passed into the memory address register for the Main Memory 18. Concurrently, the contents of the data field of the register position $R_k$ are gated through gate circuit 70 by CL–23 into the memory data register of the Main Memory 18. The clock then goes to CL–24.

CL–24 initiates a "store" access in the Main Memory 18 and also sets flip-flop 72 to a "1." Turn off CL–24 initiates CL–25. CL–25 tests to see whether or not the store access is complete by means of the gate 74. If the access is not complete, the system proceeds CL–26 which is for delay and upon turn-off cycles back to CL–25. Assuming that the access is complete, the system branches to CL–27. CL–27 is applied to OR circuit 62 to enable gate 64 and again gate the *k* field from the Instruction Register into the Decoder 26 which again accesses the register position $R_k$. Concurrently, CL–27 is applied to OR gate 46 to enable gate 48 which passes the "increment" field of the register position $R_k$ through the Incrementer 50 where it is incremented by "1" and passed into the Hold Register 52. The turn off of CL–27 initiates CL–28 which is applied to OR gate 62 and gate 64 to again access the *k* field of the Instruction Register to enable the Decoder 26 to access the local storage 14 at register position $R_k$ and by applying pulse CL–28 to OR circuit 55 enabling gate 57. The contents of the Hold Register 52 are stored in the "increment" field of register position $R_k$ in the Local Storage unit 14. The turn off of CL–28 indicates the "end" of the present instruction sequence subsequent to which the system will bring up a new instruction to the Instruction Register under independent system control as explained previously.

The above description of the operation of the disclosed embodiment of FIG. 2 together with the Timing Sequence Chart, completes the description of the presently disclosed embodiment of the invention. It will be readily appreciated that the register addresses (*i, j,* and *k*) could be replaced by other address indicators referring to other registers included in the Local Storage Unit 14. The Decoder 26 would automatically decode the proper register storage position and the disclosed controls for performing the load and store operations would be automatically initiated and performed by appropriately loading the functional fields indicated by $F_i$, $F_j$, and $F_k$.

It will be apparent from the above description of the preferred embodiment of the invention, as well as the general description of the inventive concepts present, that many changes and alterations could be made in the present system within the spirit and scope of the invention. For example, instead of merely having a single bit field carried with each Instruction Register address, a two-bit field could be utilized which could branch to either a load or to a store operation thus providing greater flexibility of operation. However, this would of course involve appropriately more hardware to affect the test and branch operations.

It will of course be understood that with the present system normal instructions may be processed, in the usual way, i.e., non-loop instructions whereby the setting of the control bits to zero will bypass the hardware of the present system.

An alternative method for determining the address to be utilized in the store and fetch operations of the present system would be to use ordinary index registers to hold the address information. Then, it would only be necessary to provide field lengths in the local storage capable of specifying the address of the particular index registers to be utilized. This also would require additional logic and switching circuitry; however, the field length of the Local Storage registers 14 could be reduced.

Similarly, other means and hardware could be utilized to determine specific addresses required of any given system, it being readily apparent that such decisions could well be made by those skilled in the art utilizing the principles outlined herein.

While the invention has been particularly shown and described with reference to a preferred embodiment thereof, it will be understood by those skilled in the art that various changes in form and details may be made therein without departing from the spirit and scope of the invention.

What is claimed is:

1. A method for reducing the number of instructions in a program loop involving loading and storing operations in local registers wherein each register contains storage fields for data and address generating information, said method comprising:

specifying in the instruction stream prior to entering the loop an initialized local register content comprising data and address generating information to be loaded into said local registers, specifying within the loop a particular local register the contents of which are to be transferred to utilization apparatus, utilizing the address generating information in said specified local register for forming a main memory address, accessing memory at said address, generating new memory address generating information from the address generating information currently in said local register, and storing said new address generating information back in said specified local register.

2. A method as set forth in claim 1 including:

specifying in said loop instruction that the result of an instruction currently in the system instruction register is to be stored in a specified local register, performing the operation and storing the result in said specified local register, extracting address generating information from said specified local register, utilizing said address generating information to access the main system memory, storing the result currently in said specified local register in said main memory, utilizing said current address generating information to develop updated address generating information indicating the address in memory at which the next result is to be stored and storing said updated address generating information in said local register.

3. A method as set forth in claim 2 including preloading the address generating information field of said specified local register with address index data and effective address data, said address updating including:

accessing the current index data from said specified local register, incrementing said index data by a desired amount, and restoring said incremented index data in said specified local register.

4. A method as set forth in claim 1 including:

specifying in said loop instruction that the current data contents of a specified local register are to be transferred to system execution unit means and that the local register is to be reloaded, gating the data content of said specified local register to said execution unit, utilizing said address generating information in said specified local register to produce a main memory address, accessing said main memory at said address and transferring the data content thereof to said specified local register, generating updated address generating information for the next potential memory access cycle and storing this updated information in the appropriate field of said specified local register.

5. A method as set forth in claim 4 including:
preloading the address generating information field of said specified local register with address index data and effective address data,
said address updating including:
accessing the current index data from said specified local register;
incrementing said index data by a desired amount, and restoring said incremented index data in said specified local register.

6. In a computing system including an instruction register, loading and execution means therefor, an arithmetic and logical unit operable under control of instructions in said instruction register, a main memory operable under program control for accessing and storing data to be utilized in said system, and a series of local storage registers loadable from main memory and said arithmetic unit, the improvement which comprises:
special instruction field means in the instruction register for specifically indicating whether a particular register location referred to in said local storage is to be implicitly loaded or stored,
means for decoding information placed in said special instruction field means,
additional storage field means in each register storage location in said local storage register for storing address generating information,
address generating means associated with said local storage registers for receiving address generating information therefrom for developing main memory addresses for the purpose of storing data from and transmitting data to said local storage registers,
means for effecting control of said address generating circuitry by said instruction register special field decoding means whereby operands are automatically loaded into said local registers and results are stored from said local registers into said main memory without specifying said operations within a program loop.

7. A computing system as set forth in claim 6 wherein said address generating means comprises an adder for combining an address index value and an effective address value included in said address generating information.

8. A computing system as set forth in claim 7 including address updating means for updating the address generating information after a main memory access and means for storing said information in said specified storage location.

9. A computing system as set forth in claim 8 wherein said address updating means includes
means for accessing said just used address index value from said specified storage location, means for changing this value by a predetermined amount, and
means for returning the updated index value to said specified storage register location.

10. A computing system as set forth in claim 9 wherein said means for changing the value of said index includes
an incrementer for increasing the index value a fixed specified amount on each time the index is used to develop a memory access.

11. A computing system as set forth in claim 6 including means operable upon the specification in the instruction register of a specified register location in said local storage containing an operand to initiate retrieval of the next operand from main memory including
means for accessing said address generating information from the specified register location,
means for generating a specific main memory address therefrom,
means for accessing the data at said address in said main memory,
means for storing said data in the specified register location,
means for updating at least a portion of the current address generating information from which the address in memory of a next operand may be determined, and
means for storing said updated address information in the address generating field of the specified storage location of said local storage register.

12. A computing system as set forth in claim 11 including means for automatically storing the result of a particular operation in main memory which includes:
means for first storing the result in a specified register location in said local storage,
means for extracting the address generating portion from said specified register location for generating a main memory address therefrom,
means for accessing said main memory at said address,
means for storing the data field from said specified register location in said main memory,
means for updating at least a portion of the current address generating information to indicate the address in main memory at which the next result is to be stored, and
means for replacing this updated address information in the specified local storage register location.

References Cited

UNITED STATES PATENTS

| | | |
|---|---|---|
| 3,380,025 | 4/1968 | Ragland. |
| 3,391,394 | 7/1968 | Ottaway et al. |
| 3,445,818 | 5/1969 | Yen. |

GARETH D. SHAW, Primary Examiner